US006772130B1

(12) United States Patent
Karbowski et al.

(10) Patent No.: US 6,772,130 B1
(45) Date of Patent: Aug. 3, 2004

(54) METHOD FOR PARCEL TRACKING ON THE INTERNET WITH E-MAIL NOTIFICATION

(75) Inventors: Kenneth Karbowski, Farmington, CT (US); Glen A. Boucher, Ansonia, CT (US); Richard J. Krouch, Milford, CT (US); Ronald S. Miller, Milford, CT (US); Angela Njo, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 224 days.

(21) Appl. No.: 09/718,712

(22) Filed: Nov. 22, 2000

(51) Int. Cl.[7] .............................................. G06F 17/60
(52) U.S. Cl. ..................................................... 705/26
(58) Field of Search ............................ 705/27, 26, 25, 705/6

(56) References Cited

U.S. PATENT DOCUMENTS

| | | | |
|---|---|---|---|
| 4,839,813 A | 6/1989 | Hills et al. ............. | 364/464.03 |
| 5,313,051 A | 5/1994 | Brigida et al. ............... | 235/375 |
| 5,627,517 A | 5/1997 | Theimer et al. ............ | 340/572 |
| 5,710,887 A * | 1/1998 | Chelliah et al. ............ | 395/226 |
| 5,869,819 A | 2/1999 | Knowles et al. ............ | 235/375 |
| 5,971,587 A | 10/1999 | Kato et al. ............. | 364/468.22 |
| 5,992,752 A * | 11/1999 | Wilz et al. ............. | 235/472.01 |
| 6,047,264 A * | 4/2000 | Fisher et al. ................... | 705/26 |
| 6,094,642 A | 7/2000 | Stephenson et al. .......... | 705/28 |
| 6,134,548 A * | 10/2000 | Gottsman et al. ............... | 707/5 |
| 6,152,369 A * | 11/2000 | Wilz, Sr. et al. ........ | 235/462.01 |
| 6,263,317 B1 * | 7/2001 | Sharp et al. ................... | 705/26 |
| 6,285,916 B1 | 9/2001 | Kadaba et al. .............. | 700/222 |
| 6,321,992 B1 * | 11/2001 | Knowles et al. ........ | 235/478.01 |
| 6,324,522 B2 * | 11/2001 | Peterson et al. ............... | 705/28 |
| 6,338,434 B1 * | 1/2002 | Wilz et al. ............. | 235/462.01 |
| 6,394,354 B1 * | 5/2002 | Wilz, Sr. et al. ........ | 235/472.01 |
| 2002/0026357 A1 * | 2/2002 | Miller et al. ................... | 705/14 |

FOREIGN PATENT DOCUMENTS

WO     WO 01/65444 A1 *    7/2001    ........... G06F/17/60

OTHER PUBLICATIONS

"DHL to parcel–up operations for market," Clayton Hirst, The Independent, London, May 14, 2000.*

* cited by examiner

Primary Examiner—Jeffrey A. Smith
Assistant Examiner—Matthew Gart
(74) Attorney, Agent, or Firm—Ronald Reichman; Angelo N. Chaclas; Kimberly S. Chotkowski

(57) ABSTRACT

The present invention discloses a package tracking system and method in which a sender and a recipient of a package are provided e-mail messages including information from a sender or carrier web page and the package location status. The present invention uses a network-based service for transferring tracking information from a package carrier and the sender to the requesting party. A package tracking request, including a tracking number and an e-mail address is submitted to a data center. This tracking request is stored in a set of queues, separated by a specific carrier identification number into tracking segment requests, and then sent to the tracking website of the selected carrier in accordance with the capabilities of each carrier's website. The carrier package tracking results from the website and the information from the sender or carrier website are gathered and stored at the database. An e-mail message is sent to the intended recipient including the status and any information gathered from the sender's website.

1 Claim, 4 Drawing Sheets

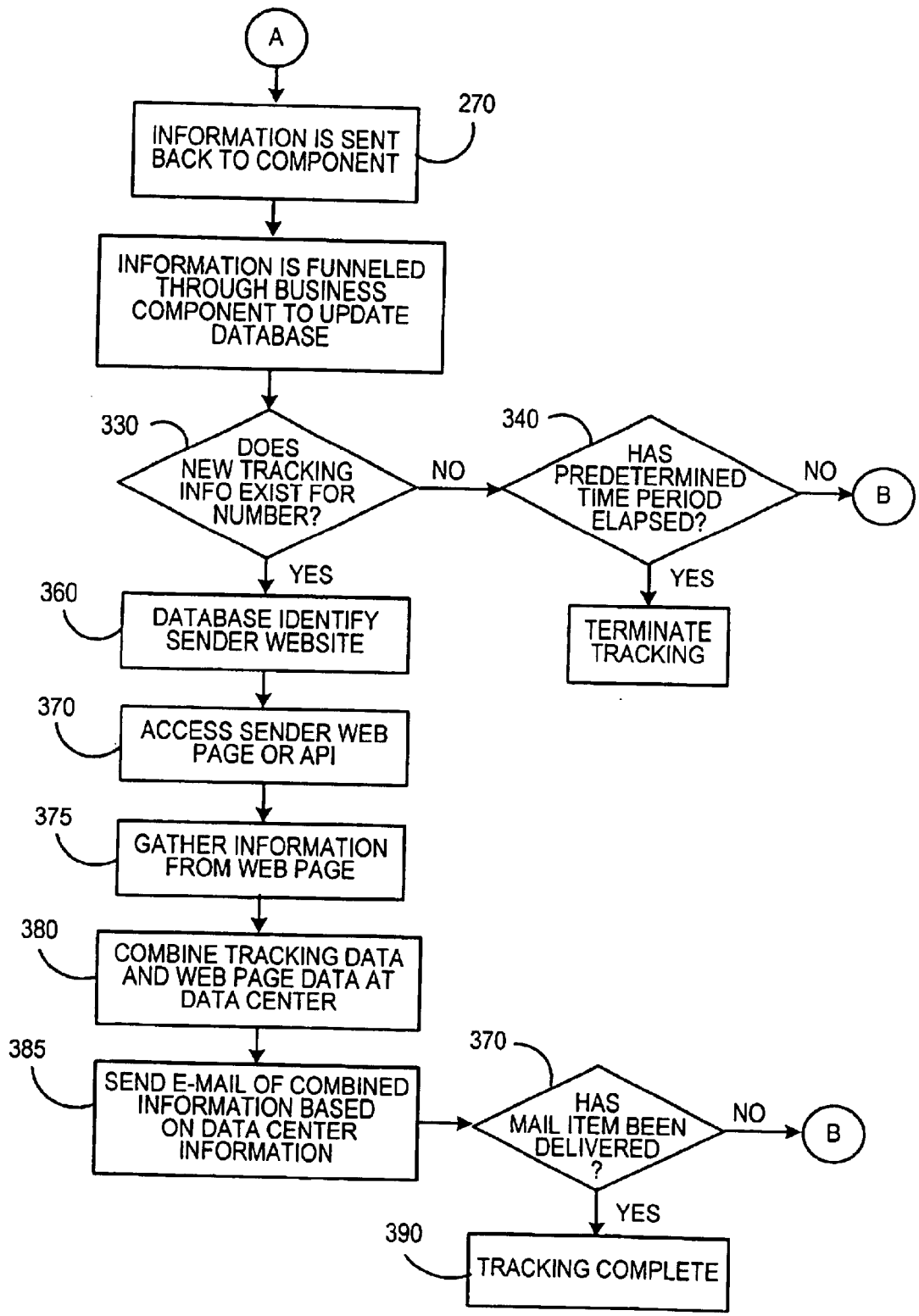

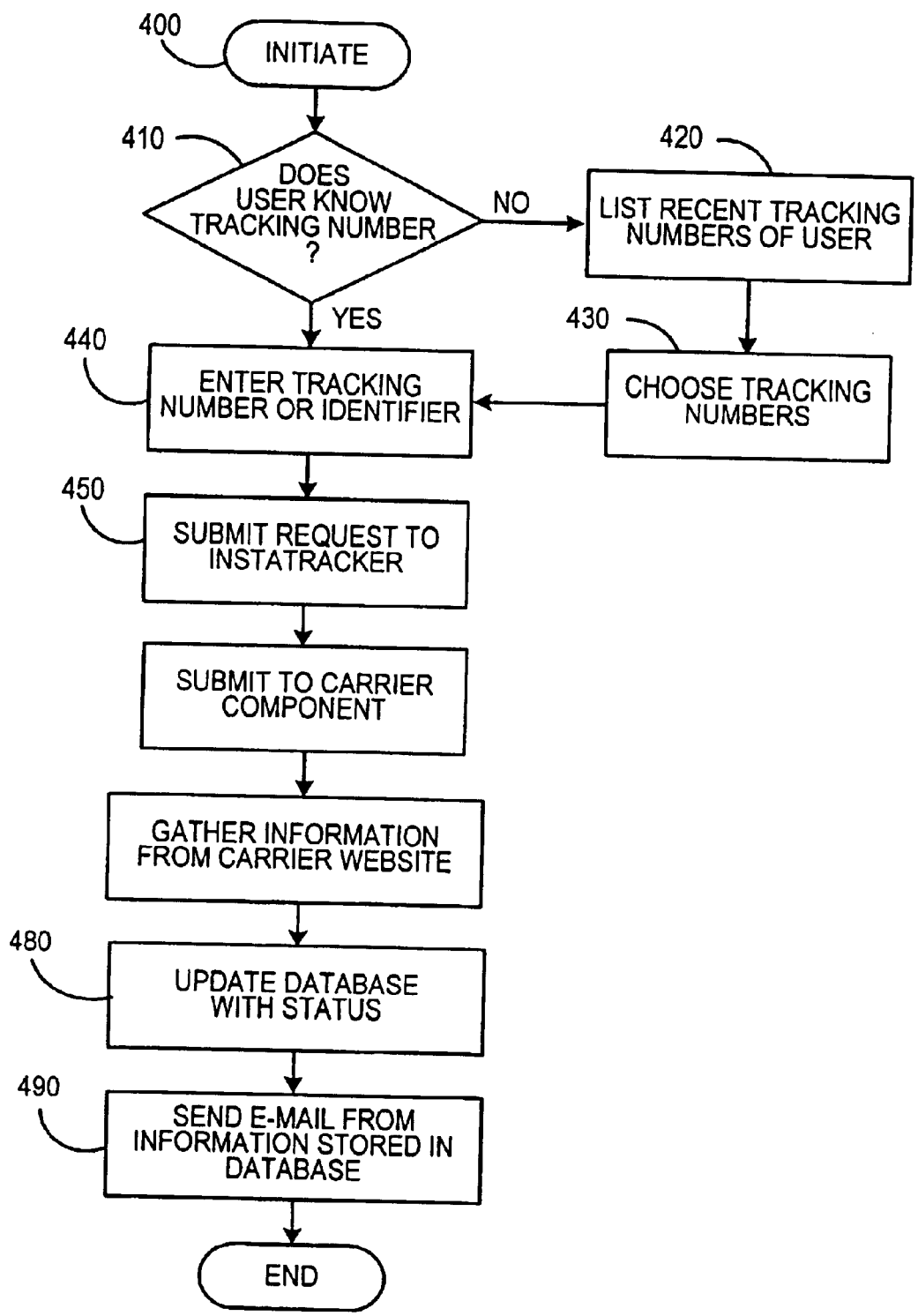

METHOD FOR PARCEL TRACKING ON THE INTERNET WITH E-MAIL NOTIFICATION

FIELD OF THE INVENTION

The invention disclosed herein relates generally to parcel shipping systems and methods. More particularly, the present invention is directed to carrier management systems and methods that track parcel delivery. Specifically, this invention relates to the periodic or direct tracking of parcel delivery and updating customers about package delivery status and originating sender data.

BACKGROUND OF THE INVENTION

Recently, time delivery guarantees for package and parcel delivery have become an essential form of business communication. With the advent of e-commerce web shopping, use of mail order has significantly increased, and so, too, has consumer's and other shipping system customer's concerns that mail order packages will not reach their designated destination due to loss or delay. Once a package has been ordered and shipped by the seller, the seller losses direct contact with its customers. However, the seller continues to be interested in maintaining contact and communicating with the customer. The best customers are repeat customers; therefore, once a seller concludes a sale, the seller also desires to solicit the customer for collateral and future purchases. However, present package delivery systems do not provide sellers the ability to maintain contact with their customers after the purchase order is placed and the item is shipped. Therefore, customers have demanded faster, more accurate delivery of parcels and expect to be given up-to-the-minute information about the status of the parcel delivery of the mail order purchases while, at the same time, sellers are continually searching for new ways to advertise to their customers.

Customers also demand the ability to use a diverse selection of carriers in order to receive the advantage of competitive rates and to minimize loss of delivery capability caused by emergencies, such as strikes. However, customers do not wish to compromise common, easy access to their shipping information. Therefore, in the shipping of parcels, it is frequently desirable to provide access to shipping information by at least two major carriers, such as United Parcel Service® (UPS) and the United States Postal System® (USPS), in addition to a number of other carriers. Each of these carriers maintains its own distinct form of package tracking, and each has posted a Website to assist customers in tracking the package. Aspects of the information contained on each website are similar; however, each carrier offers slightly different prices and services. In these systems, the seller losses contact with the customer once the package is in the carrier's possession.

Systems for package tracking have been disclosed in U.S. Pat. No. 4,839,813 (hereinafter "the '813 patent") issued to Hills, et al. and U.S. Pat. No. 5,313,051 (hereinafter "the '051 patent") issued to Brigida, et al. The '813 patent discloses a computerized parcel shipping system which enables a user to track and record transactions of various different carriers and which can store a file of records relating to the transactions.

However, the '813 patent merely provides the ability for the user to maintain files relative to shipments made with different carriers. The '051 patent discloses a paperless parcel tracking system capable of reading bar codes on packages, capturing signatures and alphanumeric data related to the parcels using a touch panel display. The parcel data is stored and transmitted to a host system at a convenient time without the need of paper records. Neither the '051 patent nor the '813 patent provides multi-carrier automatic tracking over the Internet or the ability for seller to be visibly presented to the customer after a mail order purchase has been placed.

Most recently, the introduction of wide area networks, such as the Internet, has enabled customers to track their package status by directly accessing carrier websites. These systems are designated such that the customer can track shipping status by entering the package tracking number into the website form. This, however, requires the customer to actively request the package status. One solution to this problem is found in U.S. Pat. No. 6,047,264 (hereinafter "the '264 patent") issued to Fisher, et al., which discloses a method and system for automatically providing customers with their purchase order status via electronic mail over a computer network, without the aid of a human customer service representative and without the need for a user profile. However, this system does not enable retailers the ability to directly communicate with their customer to offer other items and promotions.

SUMMARY OF THE INVENTION

In the package tracking system and method according to the present invention, a sender and a recipient of a package are able to determine the package's location while it is enroute for delivery. At the same time the recipient is given a message about the delivery status, the sender is provided an opportunity to directly present information to the recipient about similar or collateral products and/or services. In order to achieve this result, the present invention uses a network-based service, in particular, the Internet, to provide the means for transferring tracking information from the carrier responsible for delivery of the package and product/service information from the sender to the requesting party. In particular, the present invention comprises a tracking system for a shipping system determining a carrier to be used for shipping a package to a recipient and for storing package tracking data at a shipping system database. The invention includes submitting a package tracking request to a data center including a tracking number associated with a package to be sent from the sender to the recipient by a selected carrier; and an e-mail address for receiving information about the package tracking status and information about the retailer. This tracking request is stored in a queue and separated by a specific carrier identification number into tracking segment requests. The tracking requests are then sent to the tracking website of the selected carrier in accordance with the capabilities of each carrier's website. The results from the carrier package tracking website are gathered and stored at the database. Information from the sender's website is then gathered from the corresponding sender's website and stored in combination with the updated shipping data. An e-mail message is sent to the intended recipient including the status and any information gathered from the sender's website.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 2B is a continuation of the flow charge of FIG. 2A;

FIG. 3 is a flow chart of another embodiment of the parcel tracking system of the present invention.

DETAILED DESCRIPTION OF THE PRESENT INVENTION

Figure 1:
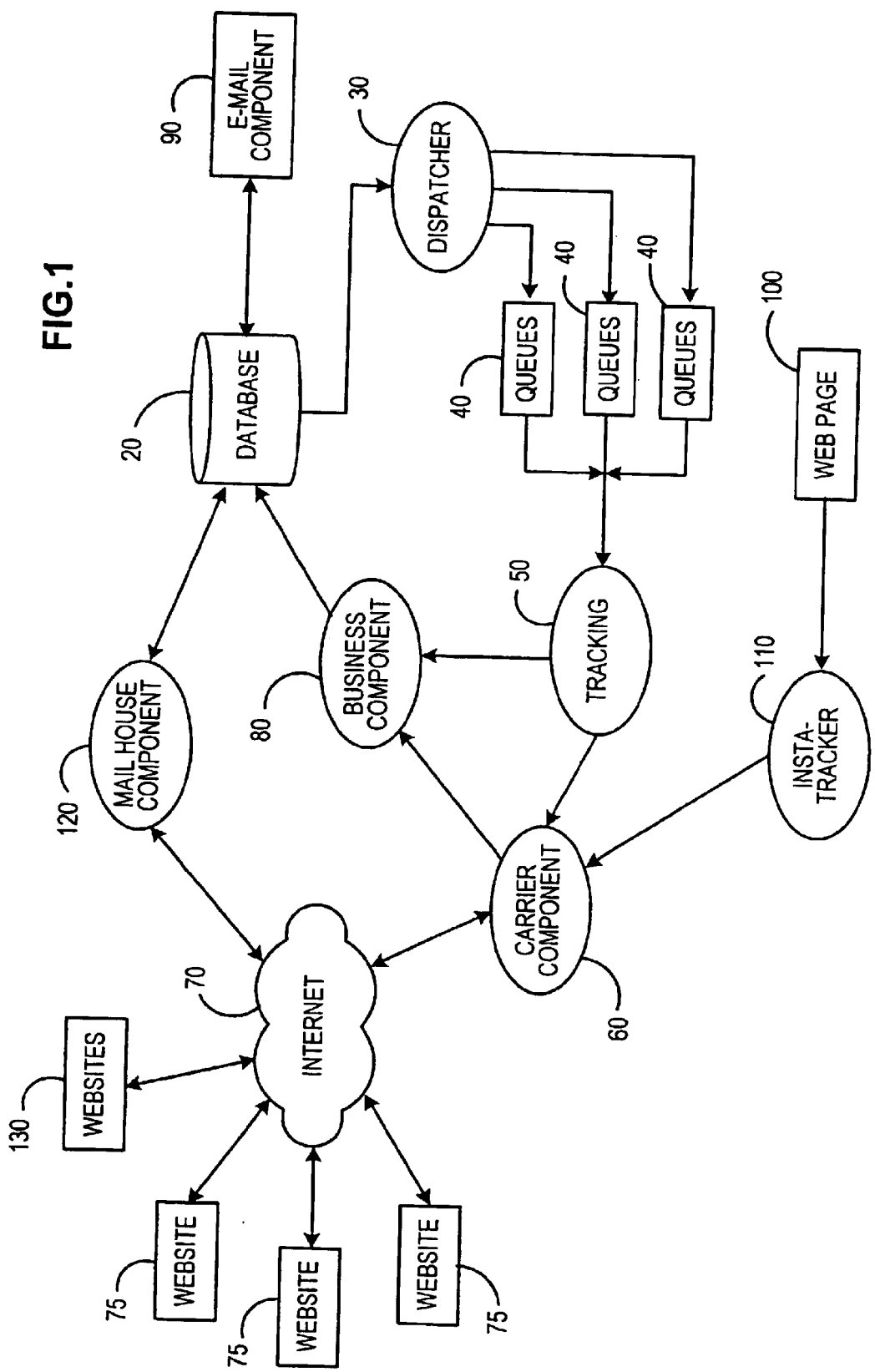
FIG. 1 is a diagram of the overall system of the present invention.

Now turning to FIG. 1, there is shown an overall system diagram of the parcel tracking system of the present invention. Database 20 stores the customer and package information for use in the tracking process. It is to be understood that the access customer may also be any user of the tracking system. The customer and package information includes a customer identification to identify a specific customer and access the system, an e-mail address to be used for automatic notification of package delivery status, an address for delivery and specific package details, such as size, package type, tracking number, etc. Database 20 sends the identical information to dispatcher 30 which determines the carrier based upon the database information and sends it to a specific carrier queue 40. Each tracking number has a specific, predetermined format for the identified carrier, enabling separation of the requests into carrier queues based upon the format of the tracking number. For example UPS® tracking numbers are formatted as eighteen number digits such as 1Z1021W70300005060 where the first two numbers are constant for domestic mail, the next six are an account number the nex two represent a service code, and the last are a tracking number, FedEx® tracking numbers are formatted as 30086151811 which also may be broken down into a constant number, an account number, service code and tracking number.

Tracking component 50 communicates between carrier queues 40 and carrier component 60 which then communicates with carrier websites 70. Tracking component 50 distributes the total number of tracking requests among all the servers in a cluster such that no one single server is over-burdened with requiring tracking. Tracking component 50 also spaces the tracking requests over a period of time as dictated by the capabilities of the carrier server so that no carrier website is flooded with requests. This prevents the individual carrier from believing that their system is being attacked by an unscrupulous party. Upon receiving the request from tracking component 50, request carrier component 60 grabs delivery information for carrier websites 75 through Internet 70. The information may be taken from the website in a variety of ways, such as by scraping or API.

Business component 80 uses the carrier information gathered by carrier component 60 and updates the parcel information stored in database 20. Database 20 also directly communicates with mail house component 120 which accesses a plurality of retail websites 130 via Internet 70 for obtaining web page information from the seller. The information is returned to database 20 via Internet 70 and mail house component 120. The information is then combined at database 20 with the status information delivered by business component 80. E-mail component 90 communicates with database 20 to gather batch notifications of delivery status including the e-mail address associated with the specific package and sends a delivery tracking message to the identified e-mail address.

The overall system also includes components which enable a user to query the system directly about the delivery of specific parcels. In this alternate embodiment, web page 100 is provided for receiving a tracking request. The request is communicated by website 100 to instatracker 110 which then sends the request to carrier components 60 which obtains the delivery information from carrier website 75 through Internet 70. Business component 80 receives tracking information from tracking component 50 and is updates database 20. Again, e-mail component 90 queries database 20 for batch notifications and sends a tracking status update e-mail message to the e-mail address.

Figure 2A:
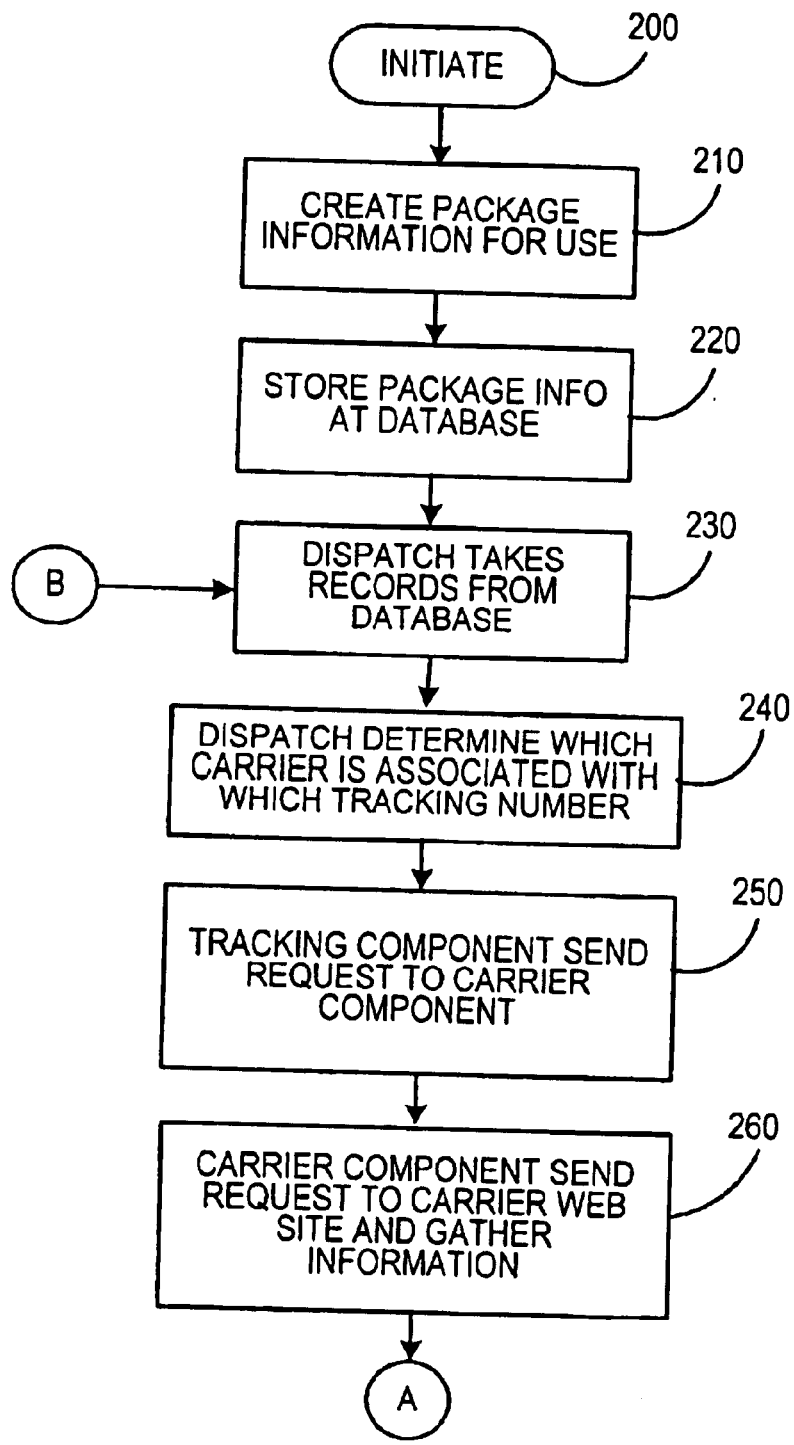
FIG. 2A is a flow chart of the method of the parcel tracking system of the present invention.

Now turning to FIG. 2A, there is shown a flow chart of the method of one embodiment of the parcel tracking system of the present invention. The method is initiated at step 200 and proceeds to step 210 where parcel information is created. Parcel information may be scanned in from a package bar code label or manually entered. At step 210, an electronic address is also entered into the system identifying what e-mail address to use for directing the resulting package tracking notification.

At step 220, the information entered at step 210 is stored in database 20. The method progresses to step 230 where dispatcher 30 gathers records from database 20 including at least the parcel tracking number. At step 240, dispatcher 30 reads the tracking number from the gathered records and determines which carriers correspond to the particular tracking numbers and which queues receive which requests. Each carrier has well-defined formats for tracking numbers; therefore, carrier identification is easily completed. At step 250, tracking component 50 parses the tracking requests into batches for delivery to carrier components 60. The shipping system tracking component controls sending the tracking requests to the designated carrier tracking website. In order to accomplish this, the tracking number created at the time that the package was shipped is used to identify the package to the corresponding carrier tracking website 75. The creation of these tracking requests must be paced since various carriers restrict the number of tracking requests that can be sent to the carrier tracking website. For example, a particular carrier tracking website may restrict the number of requests from a particular Internet Protocol (IP) address to one request every ten seconds. Thus, if the carrier sees tracking requests more frequently than one every ten seconds, it may interpret the tracking requests as an attack on the tracking website, resulting in lockout of the IP address.

In addition, other carriers may permit only a fixed number of tracking requests within a specified period of time, without regard to the frequency of such requests. Thus, it is the obligation of the shipping server tracking component 50 to ensure that tracking requests are controlled with respect to the frequency of their generation in view of the requirements of each of the carrier tracking websites. This is accomplished by tracking component 50. Tracking component 50 generates tracking requests for delivery over the Internet 70 to the associated carrier tracking website 75. Tracking requests are designated by tracking component 50 for each carrier in which tracking information is desired. Tracking component 50 obtains information for these tracking requests from corresponding carrier input tracking request queue 40. For each tracking object within a tracking request queue, tracking component 50 obtains that request through an associated programming thread since tracking component 50 operates in a multi-threaded manner.

Depending upon the pacing constraints set by the carrier, multiple threads for generating multiple tracking requests are generated. Thus, for instance, for tracking requests to be sent to Airborne® tracking website 75, multiple Airborne® tracking requests can be generated. In this example, Airborne® may have a constraint that no more than five tracing requests can be generated within a pre-determined length of time, and these tracking requests all would then be generated (assuming that at least is that number of tracking requests are in the Airborne® tracking request queue 40) by tracking component 50 on an individual software threads. Similarly, tracking component 50 generates tracking requests via individual threads for each of the carriers supported by the shipping system, which in the example shown in FIG. 1 comprises three carriers, namely, Airborne®, UPS®, and FedEx®.

Now returning to FIG. 2, the method continues at step 260 where carrier components 60 receives the tracking request and accesses the proper carrier website to take tracking information. Each carrier website has specific capabilities which may or may not exist at another carrier website. These carrier websites operate independently of the present invention and, therefore, a detailed understanding of the method and system for creating the tracking information that is located on these websites is not necessary for an understanding of the present invention. However, it should be noted that the information required to track parcels according to the present invention is available at the carrier websites. In order to obtain this information, the present invention talks to these websites by either API or scraping. The method continues from step 260 to connector A.

Now turning to FIG. 2B, the method continues along path A to step 270 where the information gathered at carrier components 60 from carrier website 75 through Internet 70 is sent to tracking component 50, then to be communicated to business component 80. Business component 80 determines the necessary parcel delivery or non-delivery updates for database 20. The method proceeds to step 330 where the system is queried as to whether or not new status information exists for the identified parcel tracking number. If the answer to the query at step 330 is "no", then the method proceeds to step 340. At step 340, the method queries as to whether or not a predetermined period of time has passed without change in tracking status. If the answer to the query is "yes", then the tracking system for the identified tracking number is terminated. If, however, the answer to the query at step 340 is "no", then the method proceeds to connector B and re-enters the method flow at connector B on FIG. 2A where the method flow continues by repeating the same process beginning at step 230.

If at step 330, new information about the identified mailpiece status does exist, then the method continues directly to step 360 where the database identifies the original sender of the parcel. At step 370, the method accesses a mail house component 120 and at step 375, gathers information from the original sender's website via Internet 130. At step 380, the information is sent to database 20 and combined with the tracking status update information. At step 385, an e-mail message, including the combined information, is sent based upon the information stored at database 20. The system then proceeds to step 370 where database 20 is queried as to whether or not the status update indicates that the parcel has been delivered. If the answer to the query at step 370 is "yes", then the tracking is complete at step 390. If, however, the answer to the query is "no", then the method proceeds to connector B and continues at FIG. 2A along path B where the method flow repeats the status process beginning at step 230. The method ends at step 395.

Now turning to FIG. 3, there is shown an alternate embodiment of the present invention. In this embodiment, the user may not have opted for parcel tracking at the time of initial entry of the parcel into the mail stream, but now desires to be notified of the ongoing delivery status. The user directly requests updates of the tracking system and identifies a specified address for receiving messages and the specific parcel tracking number to be tracked. The method is initiated at step 400 by directly logging onto the system's web page 100. The method proceeds to step 410 where the user is queried as to whether or not the user knows the parcel tracking number of the mail piece status he/she is checking. At this point, the user is also prompted to enter an e-mail address for receiving status messages. If the user does not know the parcel tracking number, then the system presents all the tracking numbers for parcels associated with the mailer's identification. At step 430, the user is prompted to select a tracking number. The method then proceeds to step 450 described hereinbelow. If, however, at step 410 the user does know the parcel tracking number, the method progresses directly to step 440.

At step 440, the tracking number is entered into the website form by the user. At step 450, the tracking request is submitted to instatracker component 110. Instatracker component 110 communicates the request to carrier component 60 which then takes the necessary tracking information from the proper carrier website via Internet 70. At step 480, the status information is sent through business component 80 to update database 20. Proceeding to step 490, e-mail component 90 queries database 20 for status update messages and sends the appropriate message via the identified e-mail address.

While the present invention has been disclosed and described with reference to a single embodiment thereof, it will be apparent, as noted above, that variations and modifications may be made therein. It is also noted that the present invention is independent of the machine being controlled, and is not limited to the control of inserting machines. It is, thus, intended in the following claims to cover each variation and modification that falls within the true spirit and scope of the present invention.

What is claimed is:

1. A method for tracking a customer's parcel in a shipping system, and determining from said parcel's sender similar or collateral products, comprising the steps of:

a. entering by a customer, at a data center a set of parcel data, said set of parcel data including at least a parcel tracking number and an e-mail address of said customer;

b. determining by the data center, based on said set of parcel data, a carrier who is shipping said parcel;

c. submitting by the data center, said parcel tracking number to a web page of said carrier;

d. receiving by the data center, updated shipping information from said carrier's web page, said updated shipping information including the tracking status of said parcel and the location of said parcel while said parcel is enroute for delivery;

e. determining by the data center, based on said set of parcel data submitted to said carrier's web page, a sender of said parcel;

f. querying by the data center, a web page of said sender for sender information, said sender information regarding similar or collateral products offered by said sender;

g. receiving by the data center, said sender information from said sender's web page;

h. combining by the data center, said updated shipping information and said sender information in an e-mail message; and i. sending by the data center, said e-mail message to said customer's e-mail address.

* * * * *